United States Patent

[11] 3,627,851

| | | | | |
|---|---|---|---|---|
| [72] | Inventor | Sam A. Brady<br>Midland, Mich. | | |
| [21] | Appl. No. | 83,620 | | |
| [22] | Filed | Oct. 23, 1970 | | |
| [45] | Patented | Dec. 14, 1971 | | |
| [73] | Assignee | Dow Corning Corporation<br>Midland, Mich. | | |

[54] FLEXIBLE COATING COMPOSITION
5 Claims, No Drawings

[52] U.S. Cl.................................................. 260/825,
117/132 BS, 260/37 SB, 260/46.5 R, 260/46.5 U,
260/46.5 H

[51] Int. Cl..................................................... C08g 47/02,
C08g 47/04, C08g 47/06

[50] Field of Search........................................... 260/82.5

[56] References Cited
UNITED STATES PATENTS

| | | | |
|---|---|---|---|
| 2,823,218 | 2/1958 | Speier et al. .................. | 260/825 |
| 3,284,406 | 11/1966 | Nelson ......................... | 260/825 |
| 3,436,366 | 4/1969 | Modic ........................... | 260/825 |

*Primary Examiner*—Samuel H. Blech
*Attorneys*—Robert F. Fleming, Jr., Laurence R. Hobey, Harry D. Dingman, Howard W. Hermann and Rober H. Borrousch ABSTRACT: A mixture of a polydiorganosiloxane gum having vinyl radicals and/or hydroxyl radicals, a benzene soluble copolymer having dimethylhydrogensiloxy units, trimethylsiloxy units and $SiO_2$ units and a platinum catalyst cured to a clear flexible coating.

FLEXIBLE COATING COMPOSITION

This invention relates to a curable organosiloxane composition.

Organosiloxane compositions which are curable are widely known in the art. These compositions are often complex and difficult to prepare. Also flexible coatings which are clear and tough have not been easily obtained. Therefore, an object of the present invention is to prepare an organosiloxane composition which can be cured to a clear, tough, flexible coating. This object and others will become more apparent from the following detailed description.

This invention relates to a curable composition consisting essentially of (A) 40 to 60 inclusive weight percent of a polydiorganosiloxane gum consisting of at least 90 mol percent dimethylsiloxane units, from 0 to 10 inclusive mol percent methylphenylsiloxane units and from 0 to 5 inclusive mol percent methylvinylsiloxane units, said polydiorganosiloxane gum being endblocked with a group selected from the group consisting of hydroxyl, dimethylvinylsiloxy, methylphenylvinylsiloxy and trimethylsiloxy where said trimethylsiloxy groups are the only endblocking groups, methylvinylsiloxane units are present in the polydiorganosiloxane gum, (B) 40 to 60 weight percent of a benzene soluble copolymeric siloxane consisting of dimethylhydrogensiloxy units, trimethylsiloxy units and $SiO_2$ units where the ratio of dimethylhydrogensiloxy units to $SiO_2$ units is from 0.4/1 to 1.2/1 inclusive, the ratio of trimethylsiloxy units to $SiO_2$ units is from 1.5/1 to 2.2/1, the ratio of the total dimethylhydrogensiloxy units and trimethylsiloxy units to $SiO_2$ units is from 2.4/1 to 3.0/1 inclusive, and (C) at least one part by weight platinum per million parts by weight of (A) and (B) where said platinum is present as a catalyst, the weight percentages of (A) and (B) being based on the combined weight of (A) and (B).

The polydiorganosiloxane gums suitable for use in the present invention are well known in the art and can be purchased commercially. The polydiorganosiloxane gums have viscosities from 5,000,000 to 50,000,000 cs. at 25° C. The polydiorganosiloxane gums within the scope of the present invention are those composed of at least 90 mol percent dimethylsiloxane units, $(CH_3)_2SiO$, where from 0 to 10 mol percent can be methylphenylsiloxane units, $CH_3(C_6H_5)SiO$, preferably the methylphenylsiloxane units are absent and from 0 to 5 mol percent methylvinylsiloxane units, $CH_3(CH_2=CH)SiO$, preferably present in amounts less than 4 mol percent. The polydiorganosiloxane gums are endblocked with hydroxyl radicals or with triorganosiloxy radicals which include dimethylvinylsiloxy radicals, methylphenylvinylsiloxy radicals and trimethylsiloxy radicals. When the polydiorganosiloxane gum is completely endblocked with trimethylsiloxy radicals, the polydiorganosiloxane gum must contain methylvinylsiloxane units, preferably in amounts of at least 0.1 mol percent. Illustrative of the polydiorganosiloxane gums are hydroxyl endblocked polydimethylsiloxane gum, dimethylvinylsiloxy endblocked polydimethylsiloxane gum, methylphenylvinylsiloxy endblocked polydimethylsiloxane gum, hydroxyl endblocked polydiorganosiloxane gum having 99.8 weight percent dimethylsiloxane units and 0.2 mol percent methylvinylsiloxane units, trimethylsiloxy endblocked polydiorganosiloxane gum having 99 mol percent dimethylsiloxane units and 1 mol percent methylvinylsiloxane, dimethylvinylsiloxy endblocked polydiorganosiloxane gum having 0.15 mol percent methylvinylsiloxane units and 99.85 mol percent dimethylsiloxane units, dimethylvinylsiloxy endblocked polydiorganosiloxane gum having 98 mol percent dimethylsiloxane units and 2 mol percent methylphenylsiloxane units, and a methylphenylvinylsiloxy endblocked polydiorganosiloxane gum having 90 mol percent dimethylsiloxane units, 5 mol percent methylphenylsiloxane units and 5 mol percent methylvinylsiloxane units, among others.

The polydiorganosiloxane gum is present in the composition in an amount of from 40 to 60 inclusive weight percent, preferably from 45 to 55 inclusive weight percent based on the combined weight of the polydiorganosiloxane gum and the benzene soluble copolymeric siloxane.

The benzene soluble copolymeric siloxanes can be prepared by the procedure described by Daudt et al. in U.S. Pat. No. 2,676,182, which is hereby incorporated by reference to describe the details in preparing benzene soluble copolymeric siloxanes derived from $R_3SiO_{0.5}$ precusers and silica hydrosols, where R is methyl or hydrogen in the present invention.

The benzene soluble copolymeric siloxanes of the present invention are composed of dimethylhydrogensiloxy units, trimethylsiloxy units and $SiO_2$ units. The ratio of dimethylhydrogensiloxy units to $SiO_2$ units is from 0.4/1 to 1.2/1 inclusive and the ratio of trimethylsiloxy units to $SiO_2$ units is from 1.5/1 to 2.2/1 inclusive. The ratio of the total number of dimethylhydrogensiloxy units and trimethylsiloxy units to $SiO_2$ units is from 2.4/1 to 3.0/1 inclusive. These benzene soluble copolymeric siloxanes can readily be prepared by the Daudt et al. procedure by using $H(CH_3)_2SiCl$ and $(CH_3)_3SiCl$ and/or $(CH_3)_3SiOSi(CH_3)_3$ and a silica hydrosol as illustrated in the examples.

The benzene soluble copolymeric siloxane is present in an amount of from 40 to 60 inclusive weight percent, preferably from 45 to 55 inclusive weight percent based on the combined weight of the polydiorganosiloxane gum and the benzene soluble copolymeric siloxane.

The platinum catalysts are well known in the art and can be present in an amount sufficient to provide at least 0.1 part by weight platinum per one million parts by weight of the combined weight of (A) and (B). The amount of platinum catalyst is not critical with respect to the upper limit, except the cost would clearly suggest that the amount used be kept within reason. Amounts of up to 200 p.p.m. platinum are not unusual, but preferably from 1 to 100 p.p.m. platinum are used.

The platinum catalyst should preferably be a soluble platinum compound or a readily dispersible compound to provide a clear cured composition. However, where the optical clarity is of no concern, platinum catalysts such as elemental platinum deposited on a support can be used. Such supports include silica, carbon and alumina. The readily dispersible platinum compounds and complexes include, for example, chloroplatinic acid, platinum chlorides, $PtCl_2\{P(CH_2CH_2CH_3)_2\}_2$, platinum bromides, a complex of platinus halide and an olefin such as ethylene, propylene, butylene, cyclohexene, styrene, olefinic polyorganosiloxane fluids, $Pt(CH_3CN)_2Cl_2$, $\{Pt(CH_3CN)_2(NH_3)_4\}Cl_2$, $Pt(NH_3)_2Cl_2$, $K\{PtCl_3(CH_2CH_2CH_2OH)\}$, $PtBr_2(C_2H_4)_2$, $K\{PtBr_3(C_2H_4)\}$, $PtCl_2(C_2H_4)_2$, $(CH_3)_2C=CH_2\cdot PtCl_2$, $H_2Pt(CN)_4\cdot 5H_2O$, $H\{PtCl_3(CH_3CN)\}$, $Pt(NH_3)_2(CNS)_2$, $\{Pt(NH_3)_4\}\cdot\{PtCl_4\}$, $PtCl_2\{P(CH_2CH_3)_3\}_2$, $PtCl_2\cdot PCl_3$, $PtCl_2\cdot P(OH)_3$, $PtCl_2\cdot P(OCH_2CH_3)_3\}_2$, $Pt(OOCCH_2SCH_2CH_3)_2$, $Pt(CN)_3$, $(CH_3)_4Pt$, $(CH_3)_3Pt-Pt(CH_3)_3$,

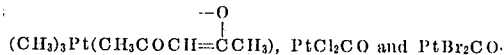

The polydiorganosiloxane gum and the benzene soluble copolymeric siloxane can be mixed in any suitable manner such as in the bulk, or in an organic solvent. The preferred method is to put the polydiorgansiloxane gum into an organic solvent and the benzene soluble copolymeric siloxane in an organic solvent and thereafter mix the two organic solvent amounts of from 30 to 90 weight percent based on the total weight of the mixture. The organic solvent can be any of those organic solvents conventionally used with organosiloxanes, for example, benzene, toluene, xylene, hexane, cyclohexane, chlorothene, heptane, methylisobutylketone, dibutylether, tetrahydrofuran, 1,1,1-trichloroethane, and the like. The platinum catalyst is preferably added after the other ingredients are mixed, particularly if one employs heat in mixing the other ingredients.

The compositions of the present invention can be cured at room temperature by allowing the organic solvent to evaporate if solvent preparation is used, or the composition cures upon addition of the platinum catalyst. The composition containing the platinum can be stored without curing, at low temperatures such as −40° C. or by using an inhibitor such as an acetylenic compound. The platinum catalyzed compositions readily cure upon heating at temperatures of 60° C. to 120° C. The cured compositions adheres strongly to many substrates, such as aluminum. The cured composition without fillers is clear, flexible and scratch resistant. The composition of the present invention is, therefore, useful as a protective coating for easily scratched surfaces, such as aluminum and copper. The surface need not be rigid, since the coating is flexible.

If desired, the composition described herein can contain fillers, dyes, pigments and other conventional additives used in silicone rubber.

The following examples are illustrative only and should not be construed as limiting the present invention which is properly delineated in the claims.

EXAMPLE 1

A. In a flask equipped with a thermometer, condenser and stirrer was placed 380 ml. of concentrated hydrochloric acid and 180 ml. of isopropanol which had been cooled to −40° C. in a bath of isopropanol and dry ice. To this cooled mixture, 486 ml. of a sodium silicate having 40 g. of $SiO_2$ per 100 ml. in 1,300 ml. of water was added with agitation. After the addition, the solution was allowed to stand for 5 minutes and then a mixture of 441.4 g. of hexamethyldisiloxane in 500 ml. of isopropanol and 333 ml. of xylene was added, followed by the addition of a mixture of 174 g. of dimethylmonochlorosilane and 148.9 g. of trimethylchlorosilane. This mixture was refluxed for 2 hours, cooled and the water layer separated and discarded. The upper layer was placed in a flask equipped with a Dean Stark trap and stirrer. The contents of the flask were heated removing isopropanol and xylene until the temperature reached 140° C. At this point, a mixture of 85 ml. of isopropanol and 85 ml. of xylene was added. The contents of the flask were again heated removing isopropanol and xylene until the temperature reached 142° C. The residue was filtered through a diatomaceous earth-filtering aid. The resulting clear solution contained 55.6 weight percent of a benzene soluble copolymeric siloxane which had a ratio of dimethylhydrogensiloxane units to $SiO_2$ units of 0.64 to 1, a ratio of trimethylsiloxane units to $SiO_2$ units of 2.07 to 1 and 0.234 weight percent silicon-bonded hydrogen atoms.

B. The procedure of A. was repeated using a mixture of 174 g. of dimethylmonochlorosilane and 160 g. of trimethylchlorosilane instead of the mixture of chlorosilanes in A. The resulting clear solution was 72.9 weight percent of a benzene soluble copolymeric siloxane which had a ratio of dimethylhydrogensiloxane units to $SiO_2$ units of 0.43 to 1, a ratio of trimethylsiloxane units to $SiO_2$ units of 2.14 to 1 and 0.165 weight percent silicon-bonded hydrogen atoms.

C. The procedure of A. was repeated using 325.4 g. of dimethylmonochlorosilane instead of the mixture of chlorosilanes. The resulting benzene soluble copolymeric siloxane had a ratio of dimethylhydrogensiloxane units to $SiO_2$ units of 1.19 to 1, a ratio of trimethylsiloxane units to $SiO_2$ units of 1.68 to 1 and 0.4 weight percent silicon-bonded hydrogen atoms.

D. Solutions of the above benzene soluble copolymeric siloxanes were diluted to 40 weight percent siloxane. Gums, as defined below, were also mixed with xylene to provide 40 weight percent gum in xylene. The weights shown below are the weights of the gum and copolymeric siloxane and not weights of the solutions. The compositions were all catalyzed with a chloroplatinic acid catalyst to provide about 10 parts platinum per million parts of gum and copolymeric siloxane. The compositions prepared were:

1. 50 g. of a hydroxyl endblocked polydimethylsiloxane gum 50 g. of the benzene soluble copolymeric siloxane of A.
2. 50 g. of the gum described in 1. 50 g. of the benzene soluble copolymeric siloxane of B.
3. 50 g. of the gum described in 1. 50 g. of the benzene soluble copolymeric siloxane of C.
4. 50 g. of a dimethylvinylsiloxy endblocked polydiorganosiloxane gum having 99.858 mol percent dimethylsiloxane units and 0.142 mol percent methylvinylsiloxane units. 50. g. of the benzene soluble copolymeric siloxane of A.
5. 50 g. of the gum described in 4. 50 g. of the benzene soluble copolymeric siloxane of B.
6. 50 g. of the gum described in 4. 50 g. of the benzene soluble copolymeric siloxane of C.
7. 50 g. of a hydroxyl endblocked polydiorganosiloxane gum having 96.033 mol percent dimethylsiloxane units and 3.967 mol percent methylvinylsiloxane units. 50 g. of the benzene soluble copolymeric siloxane of A.
8. 50 g. of the gum described in 7. 50 g. of the benzene soluble copolymeric siloxane of B.
9. 50 g. of the gum described in 7. 50 g. of the benzene soluble copolymeric siloxane of C.
10. 50 g. of a endblocked polydimethylsiloxane gum. 50 g. of the benzene soluble copolymeric siloxane of A.
11. 50 g. of the gum described in 10. 50 g. of the benzene soluble copolymeric siloxane of B.
12. 50 g. of the gum described in 10. 50 g. of the benzene soluble copolymeric siloxane of C.

Although the above compositions cured at room temperature, they were coated on aluminum strips and cured by heating at 90° C. for 15 minutes. The coatings were all clear, tough and scratch resistant. These coatings could not be damaged by scratching with a fingernail. Even the least flexible, Composition No. 9. above, did not fail the 1T bend test.

EXAMPLE 2

When any of the compositions of example 1 are mixed to provide 60 g. of gum and 40 g. of benzene soluble copolymeric siloxane, equivalent cured films are obtained. Equivalent films are also obtained when 40 g. of gum and 60 g. of benzene soluble copolymeric siloxane are used.

That which is claimed is:

1. A curable composition consisting essentially of (A) 40 to 60 inclusive weight percent of a polydiorganosiloxane gum consisting of at least 90 mol percent dimethylsiloxane units, from 0 to 10 inclusive mol percent methylphenylsiloxane units and from 0 to 5 inclusive mol percent methylvinylsiloxane units, said polydiorganosiloxane gum being end blocked with a group selected from the group consisting of hydroxyl, dimethylvinylsiloxy, methylphenylvinylsiloxy and trimethylsiloxy where said trimethylsiloxy groups are the only endblocking groups, methylvinylsiloxane units are present in the polydiorganosiloxane gum, (B) 40 to 60 weight percent of a benzene soluble copolymeric siloxane consisting of dimethylhydrogensiloxy units, trimethylsiloxy units and $SiO_2$ units where the ratio of dimethylhydrogensiloxy units to $SiO_2$ units is from 0.4/1 to 1.2/1 inclusive, the ratio of trimethylsiloxy units to $SiO_2$ units is from 1.5/1 to 2.2/1, the ratio of the total dimethylhydrogensiloxy units and trimethylsiloxy units to $SiO_2$ units is from 2.4/1 to 3.0/1 inclusive, and (C) at least one part by weight platinum per million parts by weight of (A) and (B) where said platinum is present as a catalyst, the weight percentages of (A) and (B) being based on the combined weight of (A) and (B).

2. The curable composition according to claim 1 in which the polydiorganosiloxane gum is hydroxyl endblocked.

3. The curable composition according to claim 1 in which the polydiorganosiloxane gum contains silicon-bonded vinyl radicals in the endblocking siloxane units and a total vinyl radical content of up to 4 mol percent inclusive.

4. The curable composition according to claim 1 in which an organic solvent is present in an amount of at least 10 weight percent based on the weight of the total composition.

5. The curable composition of claim 1 in which (A) is present in an amount of from 45 to 55 inclusive weight percent and (B) is 45 to 55 inclusive weight percent.